June 23, 1970      R. J. KOERNER      3,516,173
NAVIGATION APPARATUS
Filed Jan. 18, 1967      3 Sheets-Sheet 1
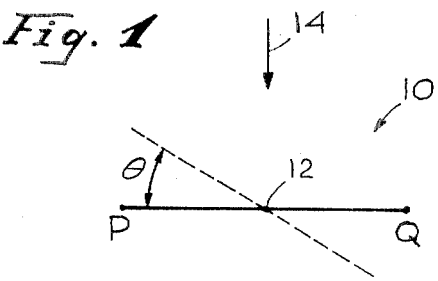
Fig. 1
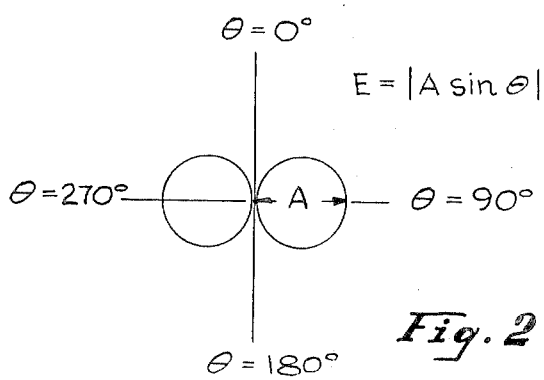
Fig. 2
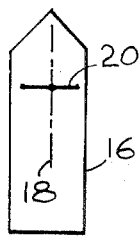
Fig. 3
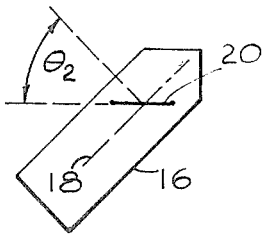
Fig. 4
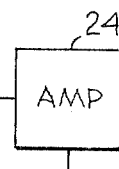
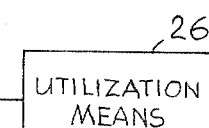
Fig. 5
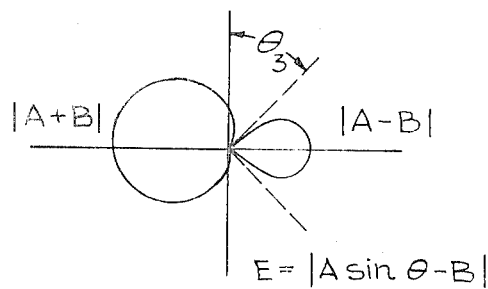
Fig. 6
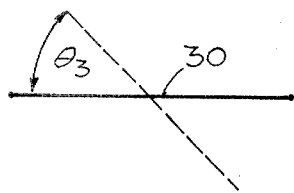
Fig. 7
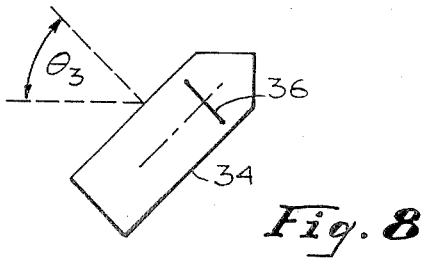
Fig. 8
INVENTOR
RALPH J. KOERNER
BY Arthur Freilich
ATTORNEY

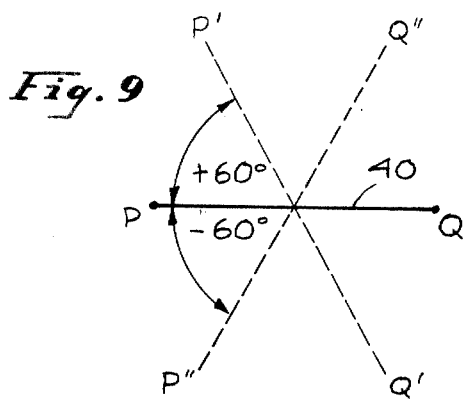
Fig. 9
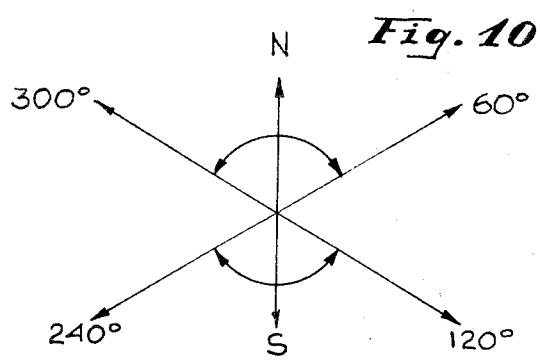
Fig. 10
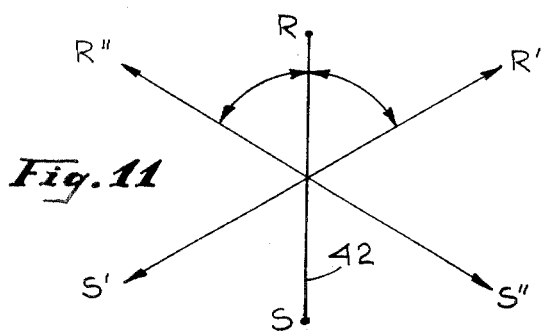
Fig. 11
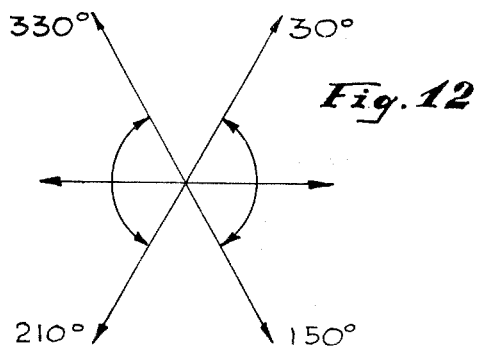
Fig. 12
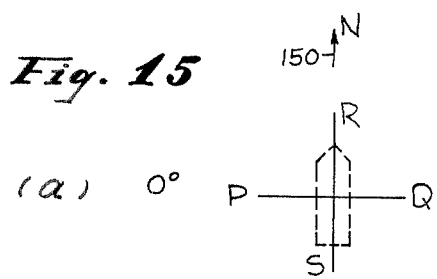
Fig. 15
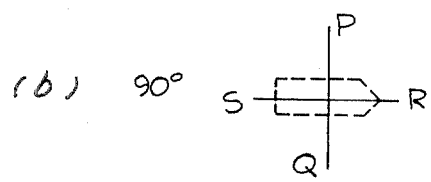
(a) 0°
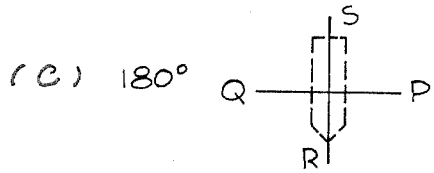
(b) 90°
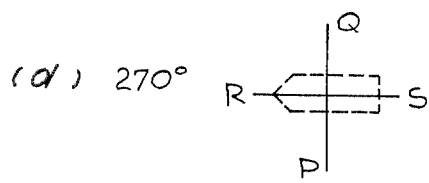
(c) 180°
(d) 270°
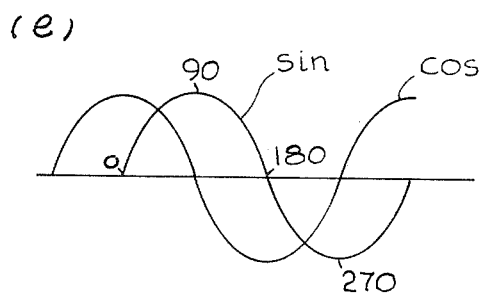
(e)
−; Q → P    S → R
+; P → Q    R → S June 23, 1970  R. J. KOERNER  3,516,173
NAVIGATION APPARATUS
Filed Jan. 18, 1967  3 Sheets-Sheet 3
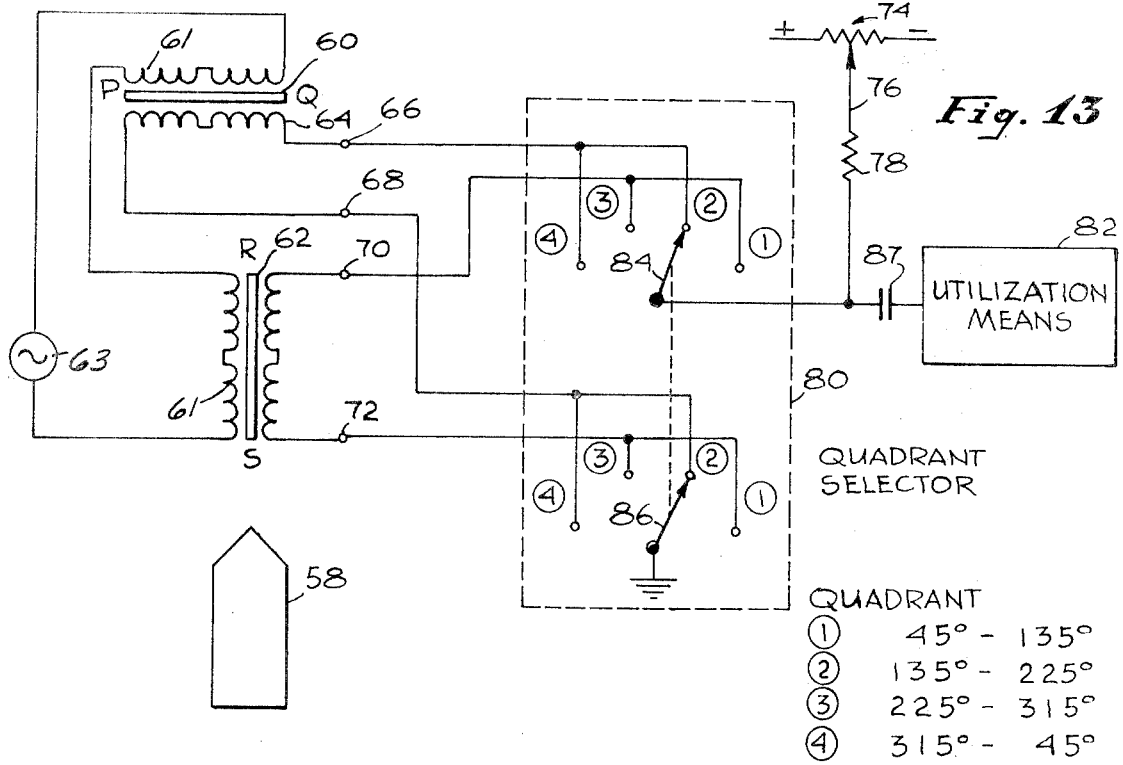
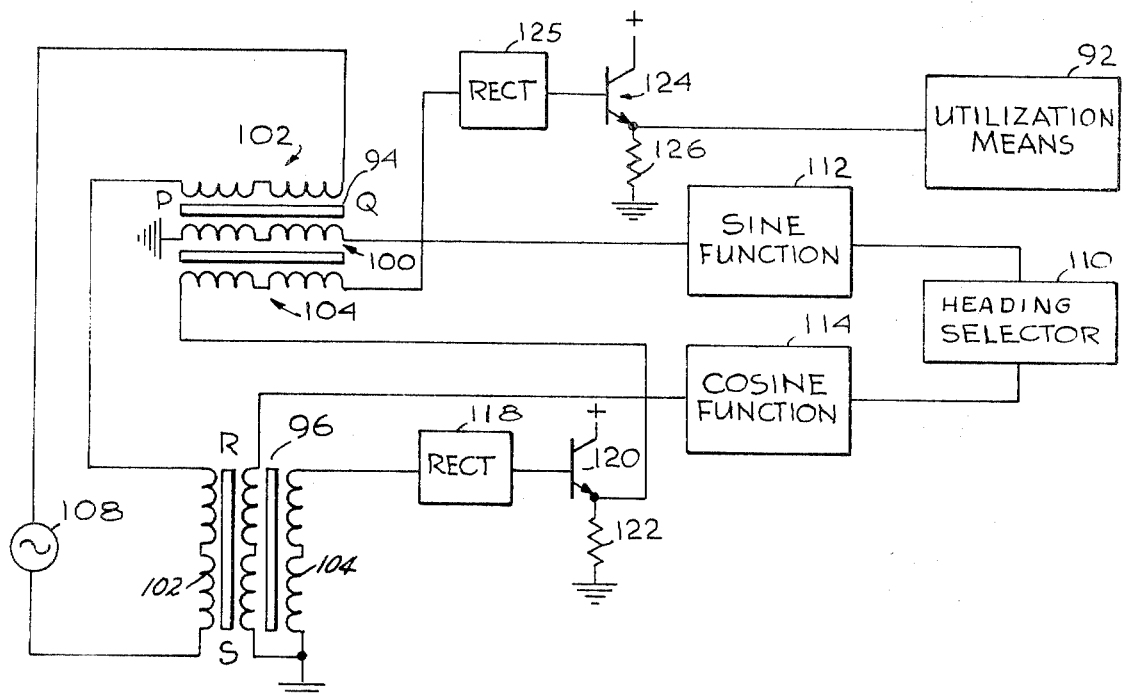
INVENTOR
RALPH J. KOERNER
BY Arthur Freilich
ATTORNEY United States Patent Office 3,516,173
Patented June 23, 1970

3,516,173
NAVIGATION APPARATUS
Ralph J. Koerner, Canoga Park, Calif., assignor, by mesne assignments, to The Bunker-Ramo Corporation, Oak Brook, Ill., a corporation of Delaware
Filed Jan. 18, 1967, Ser. No. 610,186
Int. Cl. G01c 17/02; G01r 33/04
U.S. Cl. 33—222                                          7 Claims

ABSTRACT OF THE DISCLOSURE

A system useful in combination with a navigable craft for facilitating alignment of the longitudinal axis of said craft with a selected magnetic heading. The system includes a magnetic field sensing device, e.g., a flux gate magnetometer, which provides an output signal related to the magnitude of magnetic field components along the axis thereof. The sensing device is mounted on the craft with the axis thereof bearing a fixed relationship to the craft longitudinal axis. Means are provided for applying a selected magnetic field along the sensing device axis to establish a selected magnetic heading by predetermining the craft orientation at which the component of the ambient field along the sensing device axis is equal and opposite to the selected field applied along that axis, as signaled by a null output.

Background of the invention

U.S. Pat. Nos. 3,355,705 and 3,280,781 respectively filed on Apr. 23, 1963, and Sept. 27, 1965, by Ralph J. Koerner, each assigned to the same assignee as the present application, disclose systems useful in the navigation of air and sea craft. Briefly, each of the systems employs a directional magnetic field sensing device such as a single strip magnetometer which is rotatably mounted on the craft. The sensing device provides an output signal in response to detected components of the horizontal ambient magnetic field component extending along its axis. Thus, physical rotation of the sensing device to a particular orientation enables the selection of a desired heading by nulling the sensing device output signal when the craft is aligned with that heading. The sensing device output signal controls a utilization means which in the case of Pat. No. 3,355,705 operates an indicating system for the helmsman, and in the case of Pat. No. 3,280,781 controls the craft's steering mechanism to steer the craft to the heading which nulls the sensing device output signal.

Summary of the invention

As noted, the systems of the two cited patents are common to the extent that in each, a desired heading is selected by physically orienting a sensing device mounted on the craft for rotation with respect thereto. In accordance with a significant aspect of the present invention, heading selection is accomplished by applying magnetic bias fields to a fixedly mounted sensing device. Application of the bias fields can be considered as effectively simulating the physical rotation of the sensing device. As a consequence, in accordance with the present invention, it is unnecessary to mount the sensing device for rotation, and thus more reliable installations can be provided at a lower cost. More significantly, heading selection in accordance with the present invention enables the heading to be easily selected from locations remote from the sensing device.

More particularly, in accordance with one aspect of a preferred embodiment of the present invention, the sensing device comprises a single strip magnetometer and a bias field is established thereat by the application of a DC bias current to a winding thereof. The magnitude and direction of the bias current, of course, determines the physical orientation the magnetometer must assume relative to the horizontal component of the ambient magnetic field in order to establish a null. Since the magnetometer is fixedly mounted on the craft, the physical orientation assumed by the magnetometer necessarily fixes the heading the craft will assume for a null condition.

In accordance with a further aspect of the present invention, in order to permit 360° heading selection via bias currents, first and second orthogonally oriented sensing devices are employed. In one embodiment of the invention, one or the other of the sensing devices is employed depending upon in which quadrant the selected heading lies. In another embodiment of the invention, the bias currents applied to the first and second sensing devices are varied in accordance with the sine and cosine functions respectively, and the sensing device output signals are summed to operate a utilization means.

The novel features that are considered characteristic of this invention are set forth with particularity in the appended claims. The invention will best be understood from the following description when read in connection with the accompanying drawings.

Brief description of the drawings

FIG. 1 is a schematic diagram of a directional magnetic field sensing device adapted to be rotated with respect to the ambient magnetic field;

FIG. 2 illustrates the output signal provided by the sensing device of FIG. 1 as a function of the angle of rotation;

FIG. 3 schematically illustrates how the sensing device of FIG. 1 should be oriented on a navigable craft in order to define a heading parallel to the ambient magnetic field;

FIG. 4 is a schematic diagram illustrating how the sensing device of FIG 1 should be rotated with respect to the navigable craft in order to define a heading at an angle $\theta_2$ with respect to the ambient field;

FIG. 5 is a block diagram generally describing the systems of the aforecited patents in which the teachings of FIGS. 1 through 4 were employed;

FIG. 6 illustrates the output signal characteristic of a directional magnetic field sensing device of the type shown in FIG. 1 when employed with a magnetic bias field as taught by the present invention;

FIG. 7 schematically illustrates how the application of a bias field in accordance with the present invention can simulate the physical rotation of a directional magnetic field sensing device;

FIG. 8 is a schematic diagram illustrating how the simulated rotation of a directional sensing device physically fixedly mounted on a navigable craft can be utilized to facilitate navigation of that craft;

FIG. 9 is a schematic diagram of an east/west oriented directional field sensing device which illustrates the approximate practical range through which rotation of the device can be simulated by the utilization of a bias field;

FIG. 10 schematically illustrates the range of compass headings through which the craft can be navigated in response to the simulated rotation of the device of FIG. 9 by bias currents;

FIG. 11 is a schematic diagram of a north/south oriented directional field sensing device which illustrates the approximate practical range through which the rotation of the device can be simulated by the application of a bias field thereto;

FIG. 12 schematically illustrates a range of compass headings through which a craft employing the sensing device of FIG. 11 can be navigated;

FIG. 13 is a schematic diagram of a first embodiment of the invention employing the sensing devices of FIGS. 9 and 11 in an orthogonal orientation to enable heading selection through 360°;

FIG. 14 is a schematic diagram of a second embodiment of the invention utilizing the devices of FIGS. 9 and 11 for also enabling heading selection through 360°;

FIGS. 15a–e schematically illustrates the operation of the embodiment of FIG. 14 for several different selected headings.

Description of the preferred embodiments

Attention is now called to the drawings, and initially to FIG. 1 which schematically illustrates a directional magnetic field sensing device 10 which can comprise a single strip flux gate magnetometer of the type disclosed in the aforecited patents. Such a magnetometer 10 defines an axis having first and second ends which will be respectively referred to herein as P and Q. Assume, that the magnetometer 10 is mounted for rotation about a center point 12 through some angle $\theta$. Further, assume that an ambient magnetic field, e.g., the horizontal component of the earth's magnetic field, is represented by the arrow 14.

As explained in the aforecited patent applications, the sensing device or magnetometer 10 provides a voltage output signal substantially proportional to the component of the magnetic field extending along the axis of the magnetometer 10. FIG. 2 illustrates, in polar coordinate form, the output voltage characteristic of the magnetometer 10 for different values of the angle $\theta$ from 0 to 360°. It will be noted that the characteristic illustrated in FIG. 2 is comprised of two circular lobes each tangential to a 0°/180° axis and symmetric about a 90°/270° axis. Each of the lobes comprises a circle which can be mathematically defined as $$E = |A \sin \theta|$$

where A is the ambient field 14 and $\theta$ is the angle through which the magnetometer has been rotated from the orientation shown in FIG. 1.

For the sake of simplicity, it will be assumed that the ambient field 14 extends exactly from south to north, and thus, that the magnetometer 10 in FIG. 1 is oriented east/west. Accordingly, with the magnetometer 10 oriented east/west to thus define an angle $\theta=0°$, it should be apparent that the output voltage E provided by the magnetometer will be equal to zero. This should be apparent because when the magnetometer is oriented east/west, the component of the field 14 extending along the axis thereof is equal to zero. As the angle $\theta$ increases from 0° to 90°, the component of the field 14 along the magnetometer axis increases as the sine function. When the magnetometer is oriented north/south, the maximum ambient field component A will exist along its axis. As the magnetometer axis continues to rotate in a clockwise direction to an angle $\theta=180°$, i.e., with the end P toward the east and the end Q toward the west, the field component along its axis will decrease to zero in accordance with the sine function. Thus, it should be clear that the right lobe illustrated in FIG. 2 is traced in response to the magnetometer rotating from $\theta=0°$ to $\theta=180°$. As the magnetometer continues to rotate in a clockwise direction from $\theta=180°$ to $\theta=360°$, the left lobe shown in FIG. 2 will be traced.

It should be apparent from FIG. 2 that two nulls exist in the magnetometer output voltage. That is, the output voltage E is nulled when $\theta=0°$ and when $\theta=180°$. The embodiments disclosed in the two aforecited patents essentially operate to navigate craft on the basis of these two nulls. More particularly, consider FIG. 3 which schematically illustrates a seacraft 16 having a longitudinal axis 18. In accordance with the aforecited patents, a directional sensing device such as a magnetometer 20 is mounted on the craft 16 for physical rotation with respect thereto. FIG. 3 illustrates the magnetometer 20 as being oriented perpendicular to the axis of the craft 16. By providing a utilization means responsive to a null produced by the magnetometer 20, the craft 16 can be guided along either a northerly or southerly heading. That is, the output signal of the magnetometer 20 will be nulled when the craft 16 is headed in either a north or south direction. Now, assume that it is desired to guide the craft along a heading east of north by an angle $\theta_2$. In order to do this, the magnetometer 20 of FIG. 3 can be physically rotated counterclockwise with respect to the longitudinal axis 18 by an angle $\theta_2$ as shown in FIG. 4. As noted, the utilization means responsive to the magnetometer output signal operates on the basis of an output signal null. The signal, of course, will be nulled when the axis of the magnetometer 20 is oriented east/west. In order to do this, the longitudinal axis 18 of the craft 16 must rotate clockwise by an angle $\theta_2$. Therefore, by maintaining the output voltage of the magnetometer nulled, the craft 16 can be maintained on the desired heading east of north by the angle $\theta_2$. As previously noted, a null condition is also established along a line west of south by an angle $\theta_2$. Thus, from what has been said thus far, it would appear that the configurations of FIGS. 3 and 4 inherently include an ambiguity; that is, for any heading selected, it would appear that the craft could assume a stable heading along either the selected heading or a line rotated by 180° therefrom.

In order to avoid this ambiguity, the embodiments of the aforecited patents generate a magnetic feedback field to enable the voltage output signal provided by the magnetometer for two directions differing by 180° to be distinguished. More particularly, consider the block diagram of FIG. 5 in which the output of the magnetometer 22 is illustrated as being coupled to the input of an amplifier 24. The output of the amplifier is coupled to the input of utilization means 26, which as previously indicated can comprise an indicating device for a helmsman or a system for operating the craft's steering mechanism. A feedback path 28 couples the amplifier 24 back to the magnetometer 22. The feedback path acts to always create a magnetic field in the same direction along the magnetometer axis. Let it be assumed that this feedback field always acts in a direction from the end P of the magnetometer 10 of FIG. 1 to the end Q thereof. Thus, when the magnetometer 10 of FIG. 1 rotates in a clockwise direction through the angle $\theta$ illustrated so as to cause a component of the ambient field to extend along the magnetometer axis from end P to end Q, the feedback field will aid this component of the ambient field along the axis of the magnetometer. On the other hand, assume that the magnetometer axis of FIG. 1 rotates in a clockwise direction by the illustrated angle $\theta$ plus 180°. When this occurs, the end P is toward the south and the end Q is toward the north. As a consequence, the feedback field will oppose the component of the ambient field along the magnetometer axis. Therefore, any output voltage from the magnetometer 22 of FIG. 5 supplied to the amplifier 24 will generate a feedback field which either aids or opposes the ambient field component along the magnetometer axis. Thus, whenever the magnetometer output signal is not nulled, the amplifier 24 will be driven into either regeneration or degeneration depending upon whether the ambient field component is aided or opposed by the feedback field. The utilization means 26 initiates different actions in response to the amplifier 24 defining a regenerative or degenerative state.

Whereas the embodiments of the aforecited patents employ rotatably mounted magnetic field sensing devices, in accordance with the present invention the magnetic field sensing device is fixedly mounted on the craft to be navigated and its rotation is effectively simulated by the application of a magnetic bias field thereto. More particularly, it will be recalled that the output voltage characteristic of the magnetometer illustrated in FIG. 2 is represented by the equation $$E=|A \sin \theta|$$

This equation is modified by the application of a bias field to be $$E=|A \sin \theta - B|$$

where A again represents the ambient field, B represents the bias field, and $\theta$ represents the angle through which the magnetometer axis is effectively rotated. If this equation is plotted as shown in FIG. 6, it will be noted that when $\theta$ equals 90°, the output voltage is equal to $|A-B|$. On the other hand, when $\theta$ is equal to 270°, the output voltage is equal to $|A+B|$. It will also be noted that the null points in the characteristic of FIG. 6 are dependent upon the magnitude of the bias field. Thus, the null of angle $\theta_3$ illustrated in FIG. 6 will result from one value of bias field. By varying the bias field, the null directions can be likewise altered. The present invention is accordingly based upon the capability of selecting a heading by providing a magnetic bias field which nulls the ambient field component when the craft is aligned with that heading.

More particularly, consider the magnetometer 30 depicted in FIG. 7. Let it be assumed that the magnetometer 30 is fixedly mounted with respect to the ambient field 32. From what has been said thus far, it should be appreciated that with no bias field applied to the magnetometer 30, its output voltage will be at a null with the orientation shown; i.e., with the magnetometer axis perpendicular to the ambient field. However, let it now be assumed that a bias field is applied along the magnetometer axis of a magnitude and direction which requires that the magnetometer 30 be rotated to the dotted line position illustrated in FIG. 7 in order to null the bias field. If the magnetometer is fixedly mounted on a craft, rotation of the magnetometer will, of course, require rotation of the craft. Accordingly, the craft can be navigated in accordance with the present invention by fixedly mounting the magnetic field sensing device on the craft and providing a bias field thereto which requires that the craft rotate to an angle such that the ambient field component along the sensing device axis nulls the bias field. This technique for craft navigation is illustrated in FIG. 8 wherein a craft 34 is illustrated having a sensing device 36 fixedly mounted thereon and oriented perpendicular to the longitudinal axis of the craft. If a bias field is applied along the sensing device axis to form a null at the angle $\theta_3$ as shown in FIG. 6, then it will be necessary for the craft 34 to rotate by the angle $\theta_3$ as shown in FIG. 8 in order that the component of the ambient field 38 along the axis of the magnetometer 36 nulls the applied bias field.

From the foregoing, it should be appreciated that the teachings of the invention therefore enable the magnetic field sensing device to be fixedly mounted on a craft, thus avoiding more costly and less reliable structures. Even more significant, however, by enabling a desired heading to be selected by the application of a bias field to the sensing device, rather than by requiring that the sensing device be physically rotated, it becomes significantly easier to select a heading from a remote location. That is, a bias current can be easily varied from a location on the craft 34 remote from the sensing device to establish the desired magnitude bias field at the sensing device.

Attention is now called to FIG. 9 which schematically illustrates a magnetometer 40 having an axis PQ oriented east/west with the end P thereof being west of the end Q. Application of a bias field to the magnetometer 40 theoretically should permit the simulated rotation of the magnetometer axis by an angle ±90°. That is, if a bias field equal to the ambient field is applied from the end Q toward the end P, for example, then the magnetometer axis would have to physically rotate by 90° in a counterclockwise direction in order to enable the ambient field along the axis to null the bias field.

Utilizing the single axis magnetometer shown in FIG. 9, heading selection through 360° cannot be unambiguously accomplished because the component of the ambient field along the magnetometer axis will be the same for two different orientations of the magnetometer axis. Thus, consider for example, when the magnetometer axis shown in FIG. 9 rotates in a clockwise direction through angles of 80 and 100°. It should be clear that for both of the angles, the ambient field component along the magnetometer axis will be identical. For this reason, the maximum theoretical angle through which the magnetometer axis can be effectively rotated by the application of a bias field is ±90°. However, in practical embodiments of the invention, in order to assure separation of nulls, it is more advisable to limit the simulated rotation of the magnetometer axis to angles of approximately ±60°. Thus, from the orientation shown in FIG. 9, the axis PQ can be effectively rotated in a clockwise direction by a bias field through 60° to the position P′Q′. Likewise, the axis PQ can be effectively rotated by the application of a bias field in a counterclockwise direction through 60° to the position P″Q″. Assuming that the magnetometer axis PQ of FIG. 9 is fixedly mounted on the craft such that it is oriented perpendicular to the longitudinal axis thereof as shown in FIG. 8, the simulated rotation of the axis as shown in FIG. 9 enables the craft to be navigated within a range of 60° to each side of the north/south line. In other words, utilization of the magnetometer 40 of FIG. 9 enables the craft to be navigated in the ranges shown in FIG. 10; that is, in a range between the compass points 300° and 60°, and in a range between the compass points 120° and 240°. In order to permit the craft to be navigated along headings lying between 240° and 300°, and between 60° and 120° as shown in FIG. 10, an additional magnetometer 42 having an axis RS and oriented orthogonal to the magnetometer 40 can be utilized as shown in FIG. 11.

As before, it is assumed that in order to maintain separation of nulls, the axis RS of FIG. 11 can be effectively rotated by the application of a bias field through angles of ±60°; i.e., in a clockwise direction to the position R′S′ and in a counterclockwise direction to the position R″S″. As shown in FIG. 12, therefore, utilization of the magnetometer 42 of FIG. 11 enables the craft to be navigated along a heading between compass points 30° and 150° and between compass points 210° and 330°. It will be appreciated that the operable navigation ranges for the magnetometers of FIGS. 9 and 11 therefore, overlap one another.

In the embodiment of FIG. 13, first and second orthogonally oriented magnetometers are fixedly mounted on a craft 58. The first magnetometer 60 is illustrated as having an axis PQ and the second magnetometer 62 as having an axis RS. The primary windings 61 of the magnetometers 60 and 62 are connected in series across an oscillator 63. The bias field in the embodiment of FIG. 13 is established at the first magnetometer 60 by applying a bias current across a secondary winding 64 of the magnetometer 60 between terminals 66 and 68. Similarly, a bias field is established along the axis of magnetometer 62 by applying a bias current between the terminals 70 and 72. The bias current is supplied to the magnetometers from a potentiometer 74. The impedance of the potentiometer 74 is connected across a source of DC potential. The potentiometer slider arm 76 is connected through a resistor 78 to a switching means comprising a quadrant selector 80. The quadrant selector 80 is provided to enable either one or the other of the magnetometers 60, 62 to be operational at any one time, dependent upon which quadrant a selected heading is located in.

More particularly, let the range between the compass points 45° and 135° be defined as quadrant 1. It should be clear from FIGS. 11 and 12 that a craft can be navigated within this quadrant by employing the magnetometer 62 having an axis RS. Quadrant 2 is defined as lying between 135° and 225°, and it should be clear that the magnetometer 60 having an axis PQ should be used for navigating within this quadrant. Quadrant 3 is defined from 225° to 315°, and the magnetometer having the axis RS should be used for navigation in this quadrant. Navigation in quadrant 4 between 315° and 45° should be in response to the magnetometer having an axis PQ.

The switching means or quadrant selector 80 is provided for the purpose of controlling the utilization means 82 in accordance with the appropriate magnetometer (60 or 62) dependent upon the quadrant selected. The switching means 80 is comprised of two ganged rotary switch arms 84 and 86. The switch arm 84 is connected to the resistor 78 and through capacitor 87 to the utilization means 82. The switch arm 86 is connected to ground. Each of the arms is able to contact one of four switch contacts, the contacts being numbered to correspond to the previously referred to quadrants. Thus, when the arms 84 and 86 are connected to the switch contacts 1, bias current is fed from the potentiometer 74 to the terminals 70 and 72 of the secondary winding 64 of the magnetometer 62. The previously discussed magnetometer output voltage E will appear across the secondary winding and be applied to the utilization means 82. In this manner, the quadrant selector 80 permits the magnetometer 62 to control the utilization means 82, thus permitting navigation within quadrant 1 as specified by FIGS. 11 and 12. When the switch arms 84 and 86 are switched to contacts 2, the bias current from potentiometer 74 is applied across terminals 66 and 68, and the output voltage E from magnetometer 60 is applied to utilization means 82, thereby enabling the craft 58 to be navigated in quadrant 2.

Accordingly, it should be apparent that the embodiment of FIG. 13 enables a bias field to be established along the axis of either magnetometer 60 or 62 dependent upon the quadrant in which the selected heading lies. Once the quadrant is selected by switch arms 84 and 86, the magnitude of the bias field can be controlled by moving the wiper arm 76 along the impedance of the potentiometer 74 to vary the bias current. Variation of the bias current, of course, varies the bias field to enable a specific heading to be defined as was described in connection with FIGS. 6, 7, and 8. It should be recognized that in practice, it will probably be desirable to mechanically interconnect wiper arm 76 and switch arms 84 and 86 so that a heading can be defined from a single control. This can be readily implemented since by defining a compass heading, the bias current amplitude and the quadrant are inherently defined.

Whereas the utilization means 82 of the embodiment of FIG. 13 at any one time operates in response to either the magnetometer 60 or the magnetometer 62 dependent upon the quadrant in which the defined heading lies, FIG. 14 illustrates an alternative embodiment in which a utilization means 92 is at all times responsive to the sum of the output signals provided by the two orthogonal magnetometers 94 and 96.

In FIG. 14, the magnetometers 94 and 96 correspond to the magnetometers 60 and 62 of FIG. 13 in that the axis of the magnetometer 94 is fixed perpendicular to the longitudinal axis of the craft 98, and the axis of the magnetometer 96 is fixed parallel to the longitudinal axis of the craft 98. Whereas the bias current to establish the bias field was applied to a secondary magnetometer winding in FIG. 13, the magnetometers 94 and 96 of FIG. 14 are arbitrarily illustrated as employing separate bias windings 100. More particularly, each of the magnetometers 94 and 96 includes a bias winding 100, a primary winding 102, and a secondary winding 104. The primary windings 102 of the magnetometers 94 and 96, as previously mentioned, are connected across an oscillator 108.

By properly controlling the bias fields applied to the two magnetometers 94 and 96, they can act in concert to effectively form a single composite magnetometer whose axis always tends to be oriented in a direction perpendicular to the desired heading. With reference to FIG. 15a, for example, assume that it is desired to navigate the craft 98 in a northerly direction. In order to do this, it should be apparent that no bias field need be applied along the axis of the magnetometer 94, but a maximum bias field should be applied to the magnetometer 96 to simulate the rotation of its axis by 90° to bring it into effective coincidence with the axis of magnetometer 94. In order to do this, a bias field along the axis RS from the end R to the end S thereof of sufficient amplitude to null the ambient field 150 should be provided.

Now assume it is desired to navigate the craft 98 in an easterly direction as represented by FIG. 15b. In order to do this, no bias field need be applied to the magnetometer 96, but a maximum bias field should be applied along the axis PQ of the magnetometer 94 to effectively null the ambient field. Accordingly, by supplying a bias field from end P to end Q of the axis PQ, the axis will effectively be rotated by 90° to thus coincide with the axis RS.

FIG. 15c schematically illustrates the craft headed in a southerly direction. It should be apparent now that in order to navigate the ship along this heading, it is necessary to provide a maximum bias field in the direction from end S to end R of the axis of magnetometer 96. This will have the effect of simulating the rotation of magnetometer 96 to align its axis with the axis of magnetometer 94. FIG. 15d illustrates the craft heading in a westerly direction. In order to define this heading, it should be apparent that no bias field need be applied along the axis of magnetometer 96, but a maximum bias field should be applied from end Q to end P of the axis PQ of magnetometer 94 to effectively rotate it by 90°.

From what has been said thus far with respect to FIGS. 15a–15d, it should suggest that the bias fields could be developed in accordance with sine and cosine functions as illustrated in FIG. 15e. More particularly, inasmuch as it is clear that to define a 0° heading, no bias field need be applied to magnetometer 94 while a maximum bias field should be applied to magnetometer 96, it suggests that the bias current applied to magnetometer 94 should be developed in accordance with the sine function while the bias current applied to magnetometer 96 should be developed in accordance with the cosine function. In order to demonstrate that variation of the bias currents in accordance with the sine and cosine functions results in the proper simulated rotation of the magnetometers through 360°, the values of the functions will be considered for the directions 90°, 180°, and 270° as respectively shown in FIGS. 15b, c, and d. Prior to considering these three situations, however, let it be defined that when the functions are positive, the bias fields are established either from end P toward end Q or from end R toward end S. Conversely, when the functions are negative, the bias fields are established from end Q toward end P or from end S toward end R. Now considering FIG. 15b, it will be recalled that in order to navigate the craft in the 90° direction indicated, a maximum bias field should be generated along the axis of magnetometer 94 from end P toward end Q. It should be clear from FIG. 15e that at the 90° mark, the sine wave is at a positive maximum which will provide the bias field along the axis of magnetometer 94 from end P toward end Q. At the 180° mark in FIG. 15e, it will be noted that the cosine function is at a negative maximum while the sine function is equal to zero. This will have the effect of generating a maximum bias field from end S toward end R along the axis of magnetometer 96 as previously indicated as being required to guide the craft in the 180° direction illustrated in FIG. 15c. Similarly, at the 270° mark, the sine function is at a negative maximum thereby generating a maximum bias field from end Q toward end P along the axis of the magnetometer 94. As previously recalled, this will guide the craft in a westerly direction as represented by FIG. 15d.

Returning now to the embodiment of FIG. 14, it is pointed out that a heading selector 110 is provided which enables any angle between 0 and 360° to be defined. The output of the heading selector is coupled to the input of a sine function generator 112 and a cosine function generator 114. The output of the sine function generator 112 is coupled to the bias winding 100 of the magnetometer 94. The output of the cosine function generator 114 is similarly coupled to the bias winding 100 of the magnetometer 96. The function generators 112 and 114 will provide bias currents to the bias windings in accordance with the angle defined by the heading selector 110. In other words, the course selector 110 defines an angle along the horizontal scale of FIG. 15e. The amplitude of the sine and cosine functions at that angle as illustrated in FIG. 15e is then applied to the bias windings to effectively simulate the rotation of the axes of the magnetometers 94 and 96 to an orientation coincident with a perpendicular to the selected heading.

In employing bias fields as indicated in FIG. 14 to effectively develop a single composite magnetometer, the output voltage signals provided by the secondary windings 104 of the magnetometers 94 and 96 must be summed for application to the utilization means 92. In order to do this, the output signal provided by secondary winding 104 of magnetometer 96 is coupled through a rectifier 118 to the base of a transistor 120. The voltage provided by the secondary winding 104 of the magnetometer 96 controls the base current of transistor 120 and thus the current in the emitter-collector path thereof. This, of course, establishes the output potential at the emitter of transistor 120 which is connected through a resistor 122 to ground. The potential of the emitter of transistor 120 is applied to the rectifier 125 along with the output of the secondary winding 104 of magnetometer 94. This summed potential controls the current in the emitter-collector path through transistor 124 and thus establishes the potential at the emitter thereof which is connected through resistor 126 to ground. Thus the potential at the emitter of transistor 124 represents the sum of the output signals provided by the secondary windings of magnetometers 94 and 96. This sum is provided to the utilization means 92.

From the foregoing, it should be appreciated that a system has been shown herein for facilitating the navigation of air and sea craft along a selected heading. As previously pointed out, a selected heading is defined by applying magnetic bias fields along the axis of directional magnetic field sensing devices to effectively simulate the rotation of the axis of the sensing devices. This is in contrast to previously known systems in which the sensing devices were mounted for physical rotation with respect to the craft being navigated. As a consequence of simulating the physical rotation, less expensive and more reliable installations can be provided. More significantly, however, by enabling a heading to be defined by the application of magnetic bias fields, the heading can be easily selected from remote locations by merely controlling the bias current establishing the bias field.

The embodiments of the invention in which an exclusive property or privilege is claimed are defined as follows:

1. A system useful in combination with a navigable craft for faciliating alignment of an axis of said craft with a selected magnetic heading, said system comprising:
    a sensing device having an axis and responsive to magnetic field components therealong for providing an output signal related to the amplitude thereof, said sensing device adapted to be mounted on said craft with the axis thereof bearing a fixed relationship to said craft axis;
    means for selecting a magnetic heading; and
    means responsive to said means for selecting a magnetic heading for establishing a magnetic bias field along said sensing device axis of a character dependent on the magnetic heading selected.

2. The system of claim 1 including means located remote from said sensing device for controlling the establishment of said variable magnetic bias field.

3. The system of claim 1 wherein said sensing device comprises a magnetometer having a saturable core defining said axis and at least one winding disposed therearound, and wherein said means for establishing said magnetic bias field includes means for driving a current through said winding.

4. The system of claim 3 wherein said means for driving said currrent through said winding includes means for varying the amplitude and polarity of said current.

5. In a system for use with a navigable craft for facilitating navigation of said craft;
    first and second sensing devices each having an axis and each respectively responsive to the amplitude of magnetic field components along the axis thereof for providing an output signal related thereto;
    means fixedly mounting said first and second sensing devices on said craft with said axes thereof respectively oriented substantially perpendicular to one another; and
    heading selection means for selecting a magnetic heading and including means for establishing magnetic bias fields along said axes of a character dependent on the magnetic heading selected.

6. The system of claim 5 wherein said heading selection means includes switching means for establishing a variable bias magnetic field along the axis of either said first or second sensing device dependent upon the heading selected.

7. The system of claim 5 wherein said means establishing magnetic bias field develops first and second magnetic bias fields respectively proportional to the sine and cosine function of said selected magnetic heading, and wherein said system additionally includes means respectively applying said first and second magnetic bias fields along said axes of said first and second sensing devices.

References Cited
UNITED STATES PATENTS

| | | |
|---|---|---|
| 2,158,500 | 5/1939 | Guerra. |
| 2,241,499 | 5/1941 | Barth. |
| 2,802,983 | 8/1957 | Tolles _____ 324—43 |
| 2,834,939 | 5/1958 | Tolles _____ 324—43 |
| 2,847,642 | 8/1958 | Smith. |
| 3,159,785 | 12/1964 | Beynon _____ 324—43 |
| 3,280,781 | 10/1966 | Koerner. |
| 3,355,705 | 11/1967 | Koerner. |

FOREIGN PATENTS 886,979    7/1943    France.

OTHER REFERENCES

Airborne Magnetic Detector, Product Engineering, August 1947, pp. 134–135.

ROBERT B. HULL, Primary Examiner

U.S. Cl. X.R.

33—204; 324—43